US012747857B2

(12) United States Patent
Zheng

(10) Patent No.: US 12,747,857 B2
(45) Date of Patent: Sep. 29, 2026

(54) FAN LAMP

(71) Applicant: Hangzhou Juxing Intelligent Technology Co., Ltd., Hangzhou (CN)

(72) Inventor: Hongbing Zheng, Hangzhou (CN)

(73) Assignee: Hangzhou Juxing Intelligent Technology Co., Ltd., Hangzhou (CN)

( * ) Notice: Subject to any disclaimer, the term of this patent is extended or adjusted under 35 U.S.C. 154(b) by 7 days.

(21) Appl. No.: 19/091,870

(22) Filed: Mar. 27, 2025

(65) Prior Publication Data

US 2026/0251294 A1 Aug. 27, 2026

(30) Foreign Application Priority Data

Feb. 27, 2025 (CN) ........................ 202520329360.X

(51) Int. Cl.

| | |
|---|---|
| ***F21V 33/00*** | (2006.01) |
| ***F21V 3/02*** | (2006.01) |
| ***F21V 17/16*** | (2006.01) |
| *F21Y 105/18* | (2016.01) |

(52) U.S. Cl.

CPC ............ *F21V 33/0096* (2013.01); *F21V 3/02* (2013.01); *F21V 17/164* (2013.01); *F21Y 2105/18* (2016.08)

(58) Field of Classification Search

CPC ...... F21Y 2105/18; F21V 17/164; F21V 3/02; F21V 33/0096; F04D 29/646; F04D 25/068; F04D 25/06; F04D 25/088

See application file for complete search history.

(56) References Cited

U.S. PATENT DOCUMENTS 9,901,039 B1 * 2/2018 Dellerson ............. F04D 27/007
11,540,368 B1 * 12/2022 Chen ................... F21V 33/0096
2024/0084808 A1 * 3/2024 Botkin .................... F04D 25/06

FOREIGN PATENT DOCUMENTS

CN 223177769 U * 8/2025 ........... F04D 25/068

OTHER PUBLICATIONS

Innovation Q+ NPL Search (Year: 2025).*

* cited by examiner

*Primary Examiner* — Anabel Ton
(74) *Attorney, Agent, or Firm* — IPRTOP LLC

(57) ABSTRACT

A fan lamp is provided. The fan lamp includes a motor assembly, fan blades, and a lamp assembly. The motor assembly is connected above the lamp assembly, and the fan blades are provided around a periphery of the motor assembly. The lamp assembly includes a lamp housing, a controller, a lamp panel, and a ring-shaped lampshade. The controller is configured to at least control a switch, brightness, and/or color temperature of a lamp on the lamp panel, as well as control the motor assembly. The controller is surrounded by the lamp housing and the ring-shaped lampshade, and is fixed in a hollow region of the ring-shaped lampshade. The hollow region is opaque to light. The controller of the fan lamp is integrated into the interior of the lampshade, thereby eliminating issues such as controller damage and poor electrical connections caused by vibrations or collisions.

12 Claims, 6 Drawing Sheets

FAN LAMP

CROSS-REFERENCE TO RELATED APPLICATION

The present application claims the benefit of priority to Chinese Patent Application No. 202520329360.X, entitled "FAN LAMP", filed with CNIPA on Feb. 27, 2025, the disclosure of which is incorporated herein by reference in its entirety for all purposes.

FIELD OF THE INVENTION

The present application relates to the technical field of fans, and in particular to a fan lamp.

BACKGROUND OF THE INVENTION

Fan lamps, which combine the illumination of light fixture with the cooling function of fans, are widely used in interior decoration.

Fan lamp controllers on the market are typically placed separately at the tops of the fan lamps. Since the controllers are not fixed to the fan lamp bodies, they require additional connections to the motor wire, live/neutral wire, and light source wire, which can result in issues such as loose electrical connections due to vibrations during operation. Meanwhile, the top-mounted controller design makes replacement more difficult when damaged and may lead to poor signal reception. Moreover, as shown in FIG. 1, traditional light fixtures typically have their pull cords located on the side. As a result, a longer pull cord is needed to connect it to the controller at the top of the fan lamp, which not only increases the cable length but may also cause interference or entanglement with other components during installation or use, affecting operational smoothness. Additionally, a side-mounted pull cord can result in uneven force distribution on the fixture, adversely impacting its overall structural strength and thereby reducing its stability and durability.

SUMMARY OF THE INVENTION

The present application provides a fan lamp. The fan lamp includes a motor assembly, fan blades and a lamp assembly. The motor assembly is connected above the lamp assembly, and the fan blades are provided around a periphery of the motor assembly. The lamp assembly includes a lamp housing, a controller, a lamp panel, and a ring-shaped lampshade. The controller is configured to at least control a switch, brightness, and/or color temperature of a lamp on the lamp panel, as well as control the motor assembly. The controller is surrounded by the lamp housing and the ring-shaped lampshade, and is fixed in a hollow region of the ring-shaped lampshade. The hollow region is opaque to light.

In a first embodiment of the present application, the lamp housing includes a disc-shaped top. A first annular wall extends downward from a central lower portion of the disc-shaped top. The controller is disposed in a first space surrounded by the first annular wall. The lamp assembly further includes an opaque outer cover, and the opaque outer cover is configured to cover a bottom of the first annular wall to enclose the controller within the first space.

Furthermore, a first snap-fit part is provided on an inner wall at the bottom of the first annular wall to engage with a snap-fit part of the outer cover.

Furthermore, a light-blocking wall is provided, and the light-blocking wall surrounds a central portion of the ring-shaped lampshade in a full circle. A second snap-fit part is provided on an outer wall of the first annular wall to be snapped into a snap-fit part of the light-blocking wall of the ring-shaped lampshade.

In a second embodiment of the present application, the lamp housing includes a disc-shaped top, and a central portion of the disc-shaped top is recessed downward to form a first recess. The controller is disposed in a second space enclosed by the first recess. The first recess is opaque to light. The lamp assembly further includes an outer cover, and the outer cover is configured to cover a top end of the first recess to enclose the controller within the second space.

Furthermore, a first snap-fit part is provided on an inner wall of the top of the first recess to be snapped into a snap-fit part of the outer cover.

Furthermore, a light-blocking wall is provided, and the light-blocking wall surrounds a central portion of the ring-shaped lampshade in a full circle. A second snap-fit part is provided on an outer wall of the first recess to be snapped into a snap-fit part of the light-blocking wall of the ring-shaped lampshade.

Furthermore, at least two support step surfaces are provided around an inner wall of the first recess.

Furthermore, an inner diameter of the first recess decreases from top to bottom.

Optionally, the fan lamp further includes at least one pull cord, and a first end of the pull cord is connected to the controller, while a second end of the pull cord passes through the hollow region of the ring-shaped lampshade and hangs below the fan lamp.

Optionally, the controller is a U-shaped controller.

Optionally, a limiting rib is disposed on an inner side of the lamp housing to fix the controller.

As described above, the fan lamp of the present application has the following beneficial effects.

The controller of the fan lamp is integrated into the interior of the lampshade, which eliminates issues such as controller damage and poor electrical connections caused by vibrations or collisions, and simplifies the installation, disassembly, and replacement of the controller. The controller is disposed at a lower part of the fan lamp, with all surrounding structural components made of plastic, thereby preventing signal interference.

REFERENCE NUMERALS

Figure 1:
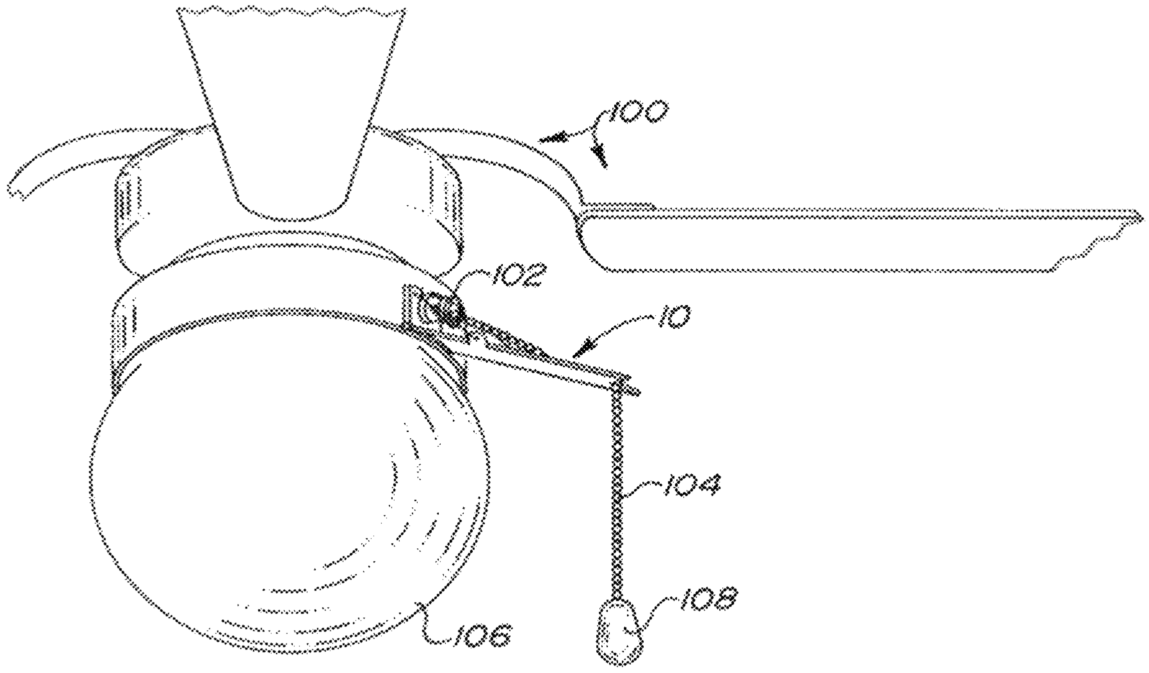
FIG. 1 is a schematic structural diagram of a fan lamp with a lamp cord in the prior art.

100 Fan lamp
10 Motor assembly
20 Fan blade
30 Lamp assembly
31 Lamp housing
311 First annular wall
312 Snap-fit part
313 Support step surface
32 Controller
33 Lamp panel
34 Ring-shaped lampshade
341 Hollow region
35 Outer cover
40 Downrod

DETAILED DESCRIPTION

The specific embodiments are described below to illustrate the implementation of the present application, and those skilled in the art can easily understand other advantages and effects of the present application from the content disclosed in this specification. The present application can also be implemented or applied in other specific embodiments. The details provided in this description can be modified or altered in various ways based on different perspectives and applications without departing from the spirit of the present application. It should be noted that the embodiments and features of the embodiments in the present application can be combined with each other as long as there is no conflict.

It should be noted that the illustrations provided in the following embodiments are merely schematic representations to explain the basic concepts of this application. Therefore, the figures only show components related to this application and are not drawn according to the actual number, shape, and size of components in practice. The actual implementation may involve variations in the type, quantity, and proportions of the components, and the layout of the components could be more complex.

In addition, descriptions such as "first", "second", etc. in the present application are only used for descriptive purposes and cannot be understood as indicating or implying their relative importance or implicitly indicating the number of the indicated technical features. Therefore, the features defined as "first" or "second" may explicitly or implicitly include at least one of the features. In addition, the technical solutions among the various embodiments can be combined with each other, but they must be based on the fact that they can be implemented by those having ordinary skills in the art. If the combination of technical solutions is contradictory or not implementable, it should be considered as not existing and outside the scope of protection claimed in the present application.

The following embodiments of the present application provide a fan lamp. The fan lamp includes a motor assembly, fan blades, and a lamp assembly. By integrating a controller into a lampshade of the lamp assembly, issues such as controller damage and poor electrical connections caused by vibrations or impacts are effectively eliminated, while the installation process of the controller is significantly simplified. The present application resolves the technical issue such as vibration-induced poor electrical connections during the fan lamp's operation due to the controller not being fixed to the main body.

The principle and implementation of the fan lamp of the present application will be described in detail below with reference to FIGS. 2-10, so that those skilled in the art can understand the fan lamp of the present application without creative effort.

Figure 2:
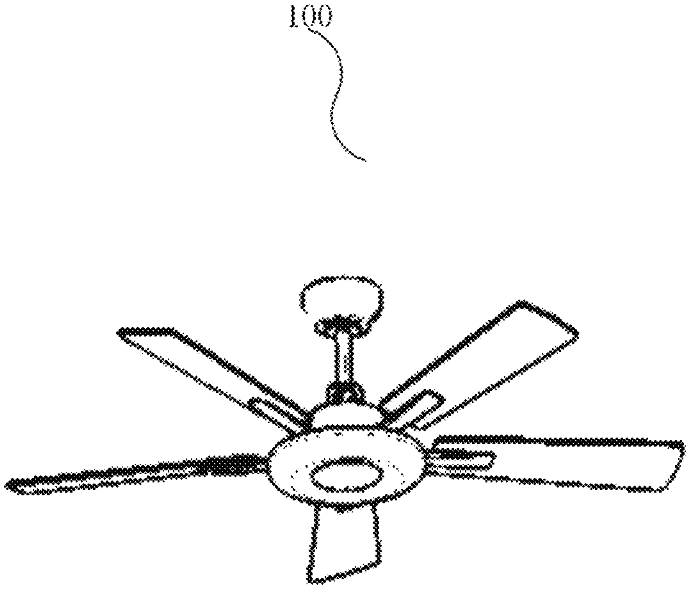
FIG. 2 is a schematic structural diagram of a fan lamp according to one embodiment of the present application.
Figure 3:
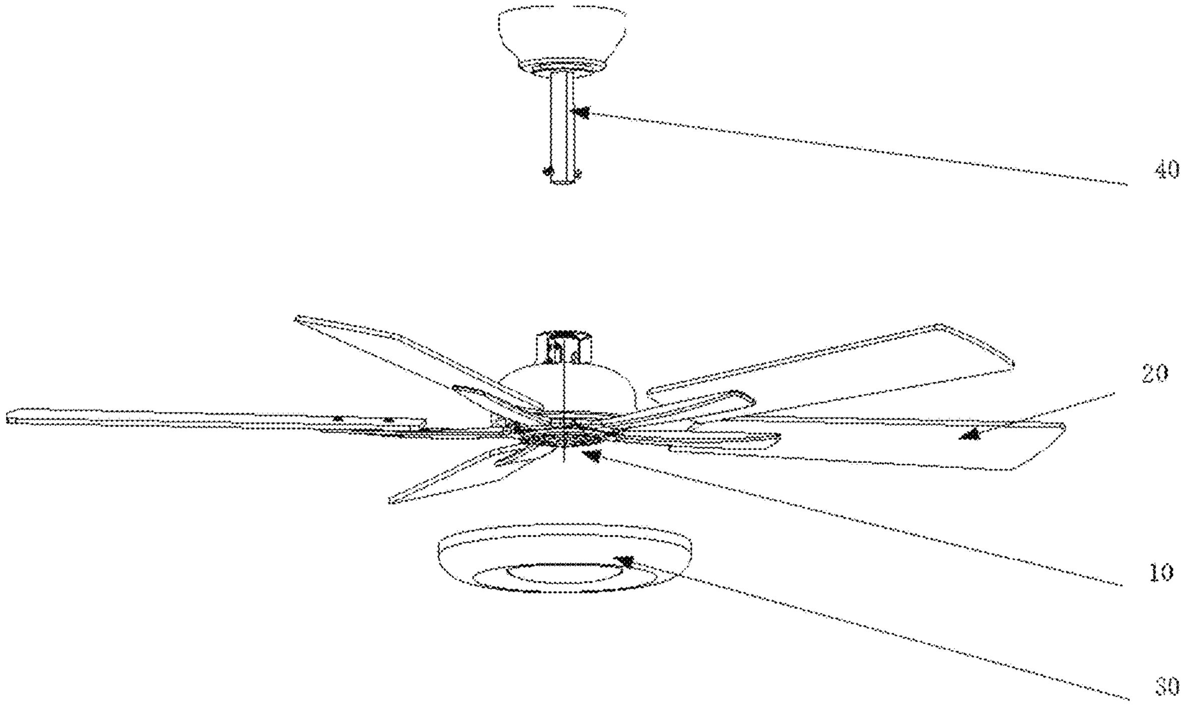
FIG. 3 is an exploded view of a fan lamp according to one embodiment of the present application.

Please refer to FIG. 2 and FIG. 3. FIG. 2 is a schematic structural diagram of a fan lamp according to an embodiment of the present application, and FIG. 3 is an exploded view of a fan lamp according to an embodiment of the present application.

As shown in FIG. 2, a fan lamp 100 includes a motor assembly 10, fan blades 20, and a lamp assembly 30. The motor assembly 10 is connected above the lamp assembly 30, and the fan blades 20 are provided around a periphery of the motor assembly 10.

In this embodiment, the fan lamp 100 further includes a downrod 40 disposed above the motor assembly 10. A first end of the downrod 40 is connected to the motor assembly 10, and a second end of the downrod 40 is fixedly connected to a wall to secure it in place.

In some embodiments, the lamp assembly 30 includes a lamp housing 31, a controller 32, a lamp panel 33, and a ring-shaped lampshade 34.

Figure 4:
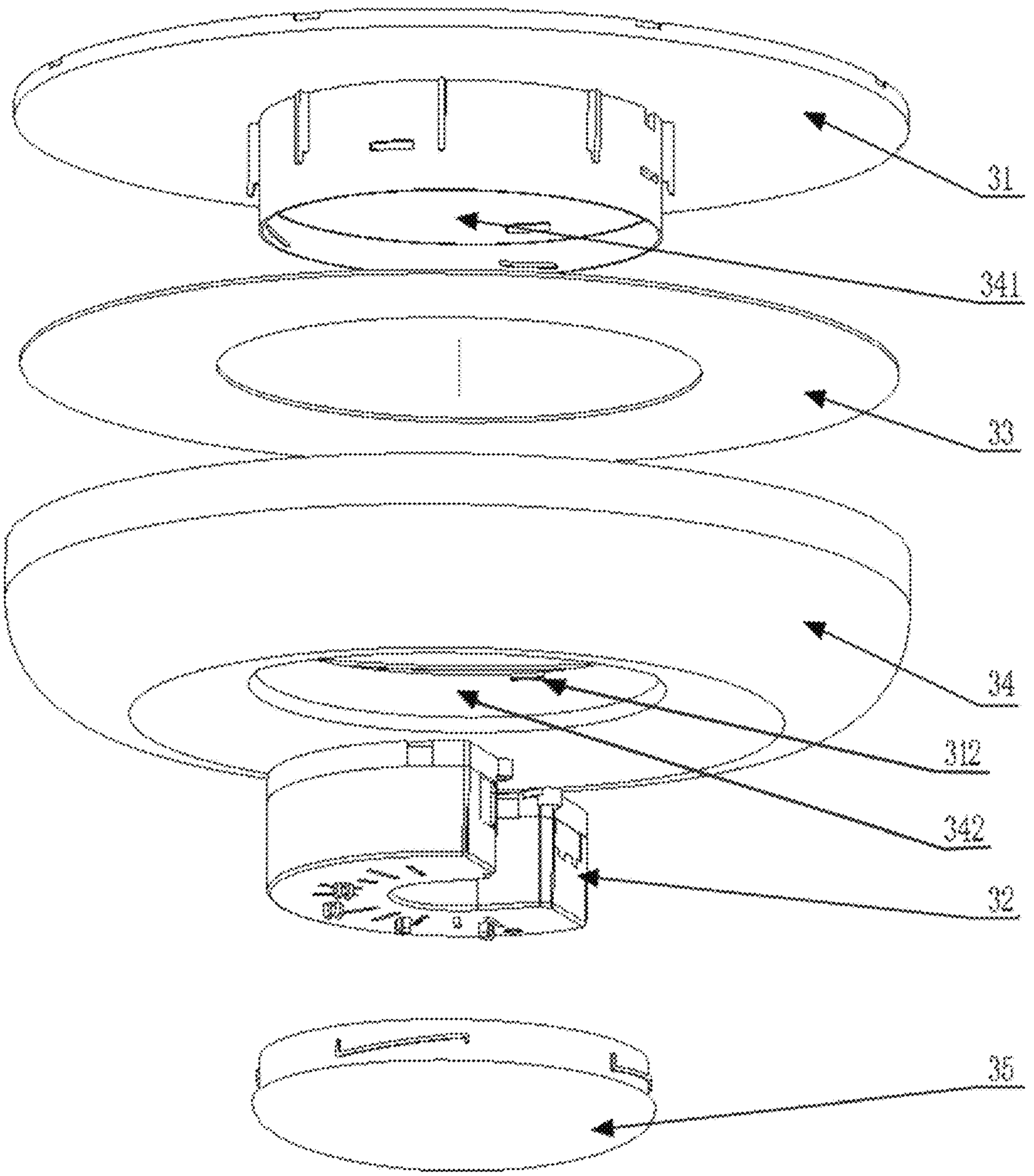
FIG. 4 is an exploded view of a lamp assembly according to a first embodiment of the present application.

Please refer to FIG. 4, which shows an exploded view of a lamp assembly according to a first embodiment of the present application.

As shown in FIG. 4, the lamp assembly 30 includes a lamp housing 31, a controller 32, a lamp panel 33, and a ring-shaped lampshade 34. The controller 32 is configured to control at least one of a switch, brightness, and color temperature of a lamp on the lamp panel 33, as well as control the motor assembly 10. The controller 32 is surrounded by the lamp housing 31 and the ring-shaped lampshade 34, and is fixed in a hollow region 341 of the ring-shaped lampshade 34.

Furthermore, a light-blocking wall 342 is provided, and the light-blocking wall 342 surrounds a central portion of the ring-shaped lampshade 34 in a full circle. A second snap-fit part 312 is provided on an outer wall of the first annular wall 311 to be snapped into a snap-fit part 312 of a light-blocking wall 342 of the ring-shaped lampshade 34.

Specifically, the controller 32 is connected to power supply and control wires of the lamp panel and fixed to the lamp housing 31 by screws.

In this embodiment, the lamp housing 31 includes a disc-shaped top. A first annular wall 311 extends downward from a central part of the disc-shaped top's bottom. The controller 32 is disposed in a first space surrounded by the first annular wall 311. The lamp assembly 30 further includes an outer cover 35, and the outer cover 35 is configured to cover a bottom of the first annular wall 311 to enclose the controller 32 within the first space.

Specifically, the outer cover 35 and the first annular wall 311 are made of an opaque material, and only the ring-shaped lampshade 34 is translucent, thereby addressing the issue of uneven light illumination and the presence of a dark area at the center of the ring-shaped lampshade 34 due to the absence of a corresponding lamp panel 33.

Specifically, the opaque outer cover 35 is fixed to the lamp housing 31 by screwing the opaque outer cover 35 into the lamp housing 31 using threads.

In this embodiment, a limiting rib (not shown in the figure) is provided on an inner side of the lamp housing 31 to fix the controller 32 to the hollow region 341 of the ring-shaped lampshade 34, thereby avoiding issues such as vibration-induced controller 32 damage and poor electrical connections due to the controller 32 not being fixed to the main body of the fan lamp 100, while significantly extending the service life of the fan lamp 100.

In this embodiment, the controller 32 and the lamp panel 33 are fixed together. The motor wire, along with the neutral and live wires of the motor, is then connected, making the mounting process simple and convenient.

Figure 5:
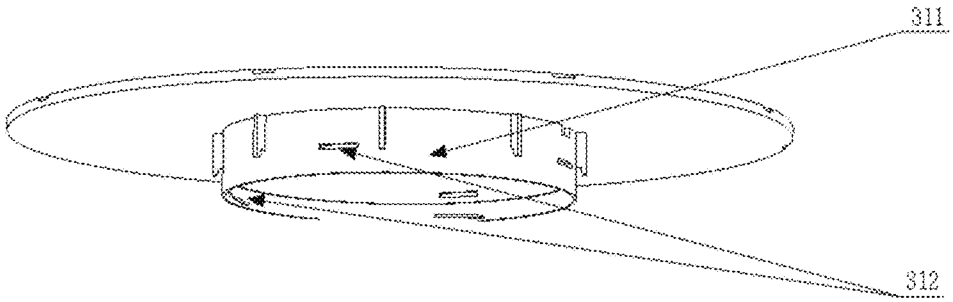
FIG. 5 is a schematic structural diagram of a first annular wall according to the first embodiment of the present application.
Figure 6:
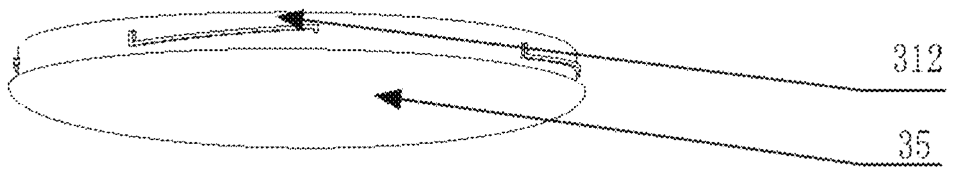
FIG. 6 is a schematic structural diagram of an outer cover according to the first embodiment of the present application.

Furthermore, as shown in FIG. 5 and FIG. 6, a first snap-fit part 312 is provided on an inner wall at the bottom of the first annular wall 311 to be snapped into a snap-fit part 312 of the outer cover 35.

Furthermore, a light-blocking wall is provided, and the light-blocking wall surrounds a central portion of the ring-shaped lampshade 34 in a full circle. A second snap-fit part 312 is provided on an outer wall of the first annular wall 311 to be snapped into a snap-fit part 312 of a light-blocking wall of the ring-shaped lampshade 34.

Specifically, the installation steps are as follows: first, the lamp assembly 30 is fixedly connected to the motor assembly 10. Then, the motor wire as well as the neutral and live wires of the motor assembly 10 pass through a hole in the middle of the lamp panel 33 to be plugged into corresponding white plugs on the controller 32. Next, the outer cover 35 is rotated and snapped into the first annular wall 311. Finally, the lamp assembly 30 and the motor assembly 10 are hung together on the downrod 40.

In this embodiment, the controller 32 is disposed in a lower portion of the lamp assembly 30. When the controller 32 needs to be replaced, only the outer cover 35 needs to be unscrewed from the first annular wall 311 to replace the controller 32, which is more convenient and faster.

It should be noted that the parts of the lamp assembly 30 around the controller 32 are all made of plastic to effectively mitigate signal interference.

Figure 7:
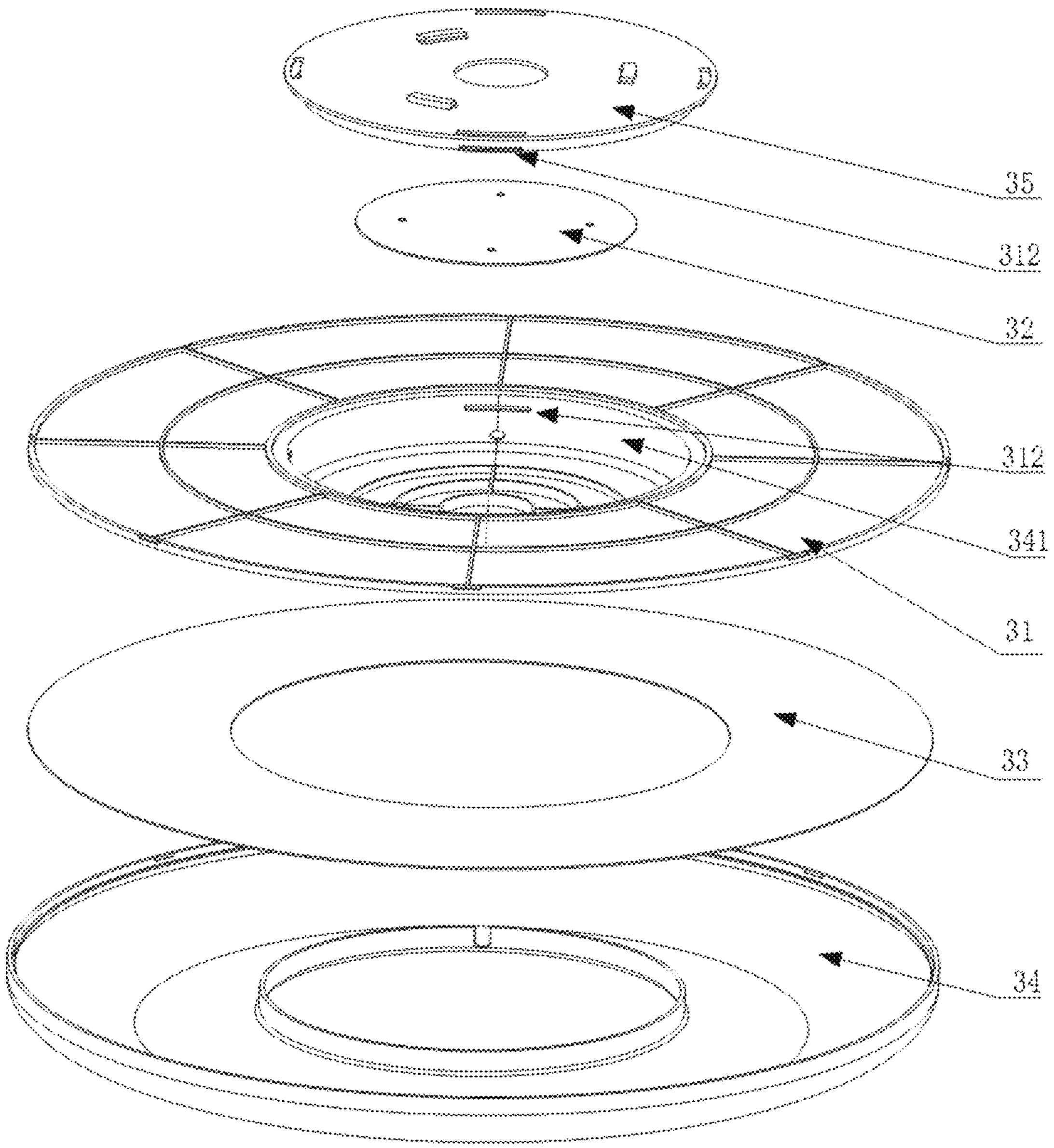
FIG. 7 is an exploded view of a lamp assembly according to a second embodiment of the present application.

Please refer to FIG. 7, which shows an exploded view of a lamp assembly according to a second embodiment of the present application.

As shown in FIG. 7, the lamp assembly 30 includes a lamp housing 31, a controller 32, a lamp panel 33, and a ring-shaped lampshade 34. The controller 32 is configured to at least control at least one of a switch, brightness and/or color temperature of a lamp provided on the lamp panel 33, as well as control the motor assembly 10. The controller 32 is surrounded by the lamp housing 31 and the ring-shaped lampshade 34, and is fixed in a hollow region 341 of the ring-shaped lampshade 34.

In this embodiment, the lamp housing 31 includes a disc-shaped top. A central portion of the disc-shaped top is recessed downward to form a first recess, and the controller 32 is disposed in a second space surrounded by the first recess. The first recess is opaque to light. The lamp assembly 30 further includes an outer cover 35. The outer cover 35 is configured to cover a top end of the first recess to enclose the controller 32 within the second space.

Furthermore, a first snap-fit part 312 is provided on an inner wall of the top of the first recess to be snapped into a snap-fit part 312 of the outer cover 35.

Furthermore, a light-blocking wall 342 is provided, and the light-blocking wall 342 surrounds a central portion of the ring-shaped lampshade 34 in a full circle. A second snap-fit part 312 is provided on an outer wall of the first recess to be snapped into a snap-fit part 312 of a light-blocking wall 342 of the ring-shaped lampshade 34.

Specifically, the light-blocking wall 342 is arranged around the central portion of the ring-shaped lampshade 34. The light-blocking wall 342 can ensure that the light of the lamp panel 33 is concentrated in the annular space surrounded by the ring-shaped lampshade 34.

In this embodiment, the controller 32 is disposed in a top portion of the lamp assembly 30. When the controller 32 needs to be replaced, only the outer cover 35 needs to be removed from the disc-shaped top of the lamp housing 31 to replace the controller 32, which is more convenient and faster.

Figure 8:
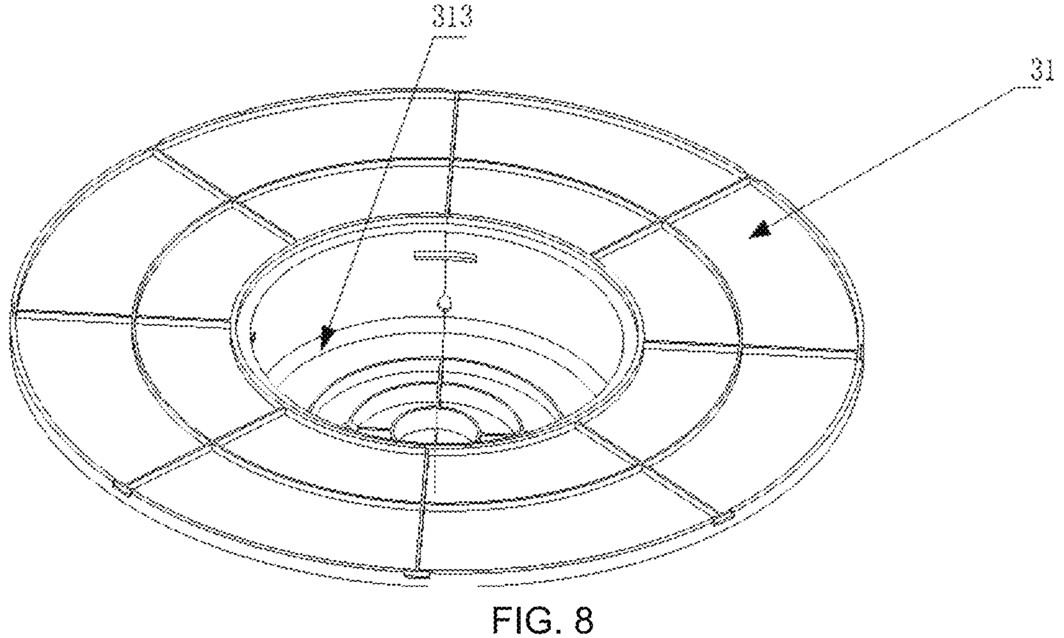
FIG. 8 is a schematic structural diagram of a lamp housing according to the second embodiment of the present application.

Furthermore, as shown in FIG. 8, support step surfaces 313 are provided around the inner wall of the first recess, and at least two support step surfaces 313 are provided. An inner diameter of the first recess decreases from top to bottom.

Specifically, by providing the support step surfaces 313 around the inner wall of the first recess, the controller 32 is stably disposed in the second space surrounded by the first recess, which prevents the controller 32 from sliding in the second space, thereby improving the overall structural stability of the lamp assembly 30 and the signal stability of the controller 32.

Figure 9:
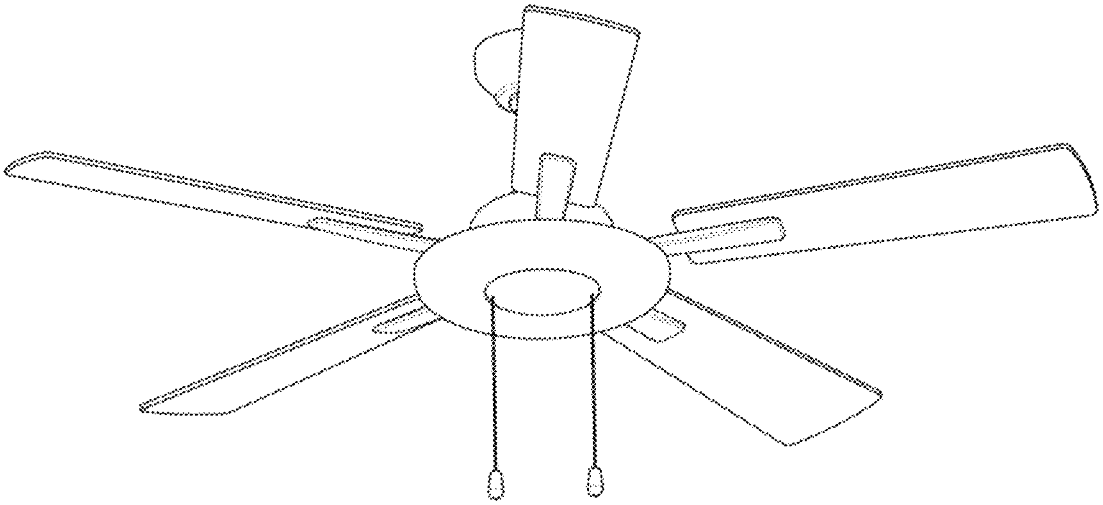
FIG. 9 is a schematic structural diagram of a fan lamp with a lamp cord according to one embodiment of the present application.

In some embodiments, the fan lamp 100 further includes a pull cord, and a first end of the pull cord is connected to the controller, while a second end of the pull cord passes through the hollow region of the ring-shaped lampshade and hangs below the fan lamp. In some embodiments, as shown in FIG. 9, two pull cords are provided to control the motor assembly 10 and lamp assembly 30, respectively. The motor assembly 10 and lamp assembly 30 are independently controlled by pulling a corresponding pull cord. Since the hollow region 341 is a non-illuminating area, the pull cord disposed in the non-illuminating area does not affect the lighting effect or the overall aesthetic of the fan lamp, while facilitating a direct connection to the controller 32 in the hollow region 341 of the ring-shaped lampshade 34, avoiding issues such as interference or jamming caused by an overly long pull cord, and enhancing the stability of fan lamp's operation.

Specifically, the light-blocking wall is arranged around the central portion of the ring-shaped lampshade 34. The light-blocking wall can ensure that the light of the lamp panel 33 is concentrated in the annular space surrounded by the ring-shaped lampshade 34.

In some embodiments, the controller 32 is a U-shaped controller 32.

Figure 10:
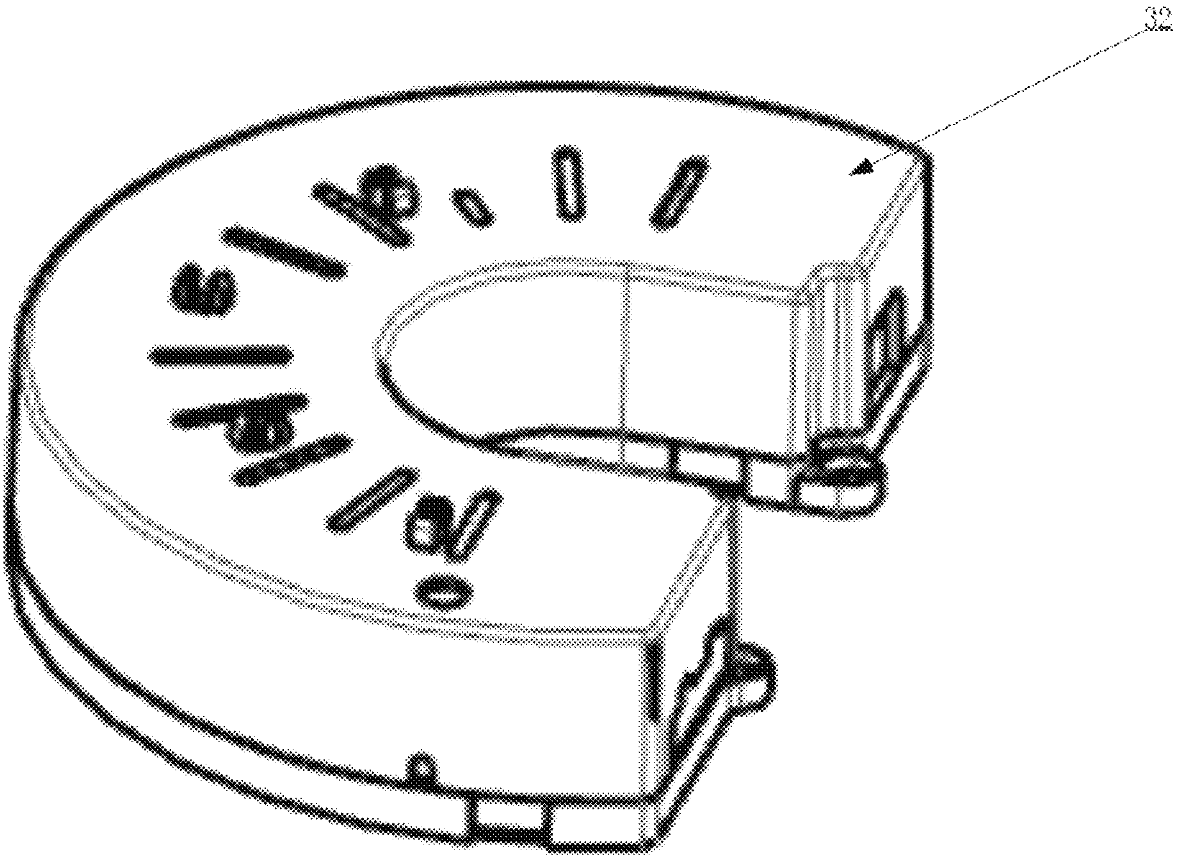
FIG. 10 is a schematic structural diagram of a controller according to one embodiment of the present application.

As shown in FIG. 10, the U-shaped controller 32 is provided.

In this embodiment, two independent control channels are provided on two ends of the controller 32. A first control channel is configured to control the light source panel independently, and a second control channel is configured to control the motor independently. The controller 32 is controlled by a remote controller to control the light switch, color change, and fan speed.

In this embodiment, wire placement regions are provided at the two ends of the controller 32 for placing various wires.

In some embodiments, the shape of the controller 32 may also be circular to facilitate its placement within the second space, which is surrounded by the first recess.

In summary, the controller of the fan lamp is integrated into the interior of the lampshade, which eliminates issues such as controller damage and poor electrical connections caused by vibrations or collisions, and simplifies the installation, disassembly, and replacement of the controller. The controller is disposed at a lower part of the fan lamp, with all surrounding structural components made of plastic, thereby preventing signal interference. Therefore, the present application effectively overcomes various shortcomings of the prior art and possesses high industrial applicability.

The embodiments described above serve merely as illustrative examples of the principles and effects of the present application, and are not intended to serve as limitations on the present application. Persons skilled in the art may modify or alter these embodiments without departing from the spirit and scope of the present application. Therefore, any equivalent modifications or alterations made by those skilled in the art, which are consistent with the spirit and technical concepts disclosed in the present application, shall still fall within the scope of the claims of the present application.

The invention claimed is:

1. A fan lamp, comprising a motor assembly, fan blades, and a lamp assembly; wherein:

the motor assembly is connected above the lamp assembly;

the fan blades are provided around a periphery of the motor assembly; and the lamp assembly includes a lamp housing, a controller, a lamp panel, and a ring-shaped lampshade, wherein the controller is configured to control at least one of a switch, brightness, and/or color temperature of a lamp on the lamp panel, as well as control the motor assembly; wherein the controller is surrounded by the lamp housing and the ring-shaped lampshade, and is fixed in a hollow region of the ring-shaped lampshade, wherein the hollow region is opaque to light.

2. The fan lamp according to claim 1, wherein the lamp housing includes a disc-shaped top, wherein a first annular wall extends downward from a central lower portion of the disc-shaped top, and the controller is disposed in a first space surrounded by the first annular wall;

wherein the lamp assembly further includes an opaque outer cover, and the opaque outer cover is configured to cover a bottom of the first annular wall to enclose the controller within the first space.

3. The fan lamp according to claim 2, wherein a first snap-fit part is provided on an inner wall at the bottom of the first annular wall to be snapped into a snap-fit part of the opaque outer cover.

4. The fan lamp according to claim 2, wherein a light-blocking wall is provided, and the light-blocking wall surrounds a central portion of the ring-shaped lampshade in a full circle, wherein a second snap-fit part is provided on an outer wall of the first annular wall to be snapped into a snap-fit part of the light-blocking wall of the ring-shaped lampshade.

5. The fan lamp according to claim 1, wherein the lamp housing includes a disc-shaped top, wherein a central portion of the disc-shaped top is recessed downward to form a first recess, and the controller is disposed in a second space surrounded by the first recess, wherein the first recess is opaque to light;

wherein the lamp assembly further includes an outer cover, and the outer cover is configured to cover a top end of the first recess to enclose the controller within the second space.

6. The fan lamp according to claim 5, wherein a first snap-fit part is provided on an inner wall of a top of the first recess to be snapped into a snap-fit part of the outer cover.

7. The fan lamp according to claim 5, wherein a light-blocking wall is provided, and the light-blocking wall surrounds a central portion of the ring-shaped lampshade in a full circle, wherein a snap-fit part is provided on an outer wall of the first recess to be snapped into a snap-fit part of the light-blocking wall of the ring-shaped lampshade.

8. The fan lamp according to claim 5, wherein at least two support step surfaces are provided around an inner wall of the first recess.

9. The fan lamp according to claim 5, wherein an inner diameter of the first recess decreases from top to bottom.

10. The fan lamp according to claim 1, further comprising at least one pull cord, wherein a first end of the pull cord is connected to the controller, and a second end of the pull cord passes through the hollow region of the ring-shaped lampshade and hangs below the fan lamp.

11. The fan lamp according to claim 1, wherein the controller is a U-shaped controller.

12. The fan lamp according to claim 1, wherein a limiting rib is provided on an inner side of the lamp housing to fix the controller.

* * * * *